United States Patent
Landa et al.

(10) Patent No.: US 12,066,010 B2
(45) Date of Patent: Aug. 20, 2024

(54) METHOD AND SYSTEM FOR DETERMINING AND TRACKING WIND TURBINE TOWER DEFLECTION

(71) Applicant: General Electric Company, Schenectady, NY (US)

(72) Inventors: Bernard P. Landa, Clifton Park, NY (US); Pierino Gianni Bonanni, Loudonville, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/712,321

(22) Filed: Apr. 4, 2022

(65) Prior Publication Data

US 2023/0313779 A1 Oct. 5, 2023

(51) Int. Cl.
| | |
|---|---|
| *F03D 7/04* | (2006.01) |
| *F03D 13/20* | (2016.01) |
| *F03D 80/50* | (2016.01) |
| *G01S 19/14* | (2010.01) |

(52) U.S. Cl.
CPC ............. *F03D 7/042* (2013.01); *F03D 13/20* (2016.05); *F03D 80/50* (2016.05); *G01S 19/14* (2013.01); *F05B 2270/331* (2013.01)

(58) Field of Classification Search
CPC ....... F03D 17/00; F03D 7/0204; F03D 7/0224
See application file for complete search history.

(56) References Cited

U.S. PATENT DOCUMENTS

| | | |
|---|---|---|
| 4,172,551 A | 10/1979 | Johnson |
| 4,182,456 A | 1/1980 | Paul |
| 4,263,099 A | 4/1981 | Porter |
| 4,453,085 A | 6/1984 | Pryor |
| 4,602,163 A | 7/1986 | Pryor |
| 4,646,388 A | 3/1987 | Weder et al. |
| 4,689,472 A | 8/1987 | Singleton et al. |
| 4,695,736 A | 9/1987 | Doman et al. |

(Continued)

FOREIGN PATENT DOCUMENTS

| | | |
|---|---|---|
| CA | 3007275 A1 | 6/2017 |
| CN | 103147917 A | 6/2013 |

(Continued)

OTHER PUBLICATIONS

C94-M8P, u-blox, u-blox RTK Application Board Package https://www.u-blox.com/en/product/c94-m8p.

(Continued)

*Primary Examiner* — Justin D Seabe
(74) *Attorney, Agent, or Firm* — Dority & Manning, P.A.

(57) ABSTRACT

A system and method are provided for determining deflection of a tower of a wind turbine, the wind turbine including a nacelle with a machine head and a rotor atop of the tower. A fixed location relative to the tower is established, and a total deflection of a geographic location ("geo-location") of the fixed location is determined. Components of the total deflection are determined that are generated by non-thrust loads acting on the tower. The non-thrust loads deflection components are subtracted from the total deflection to determine a thrust loads deflection component corresponding to deflection of the tower from operational thrust loads on the rotor.

19 Claims, 7 Drawing Sheets

(56) References Cited

U.S. PATENT DOCUMENTS

| | | |
|---|---|---|
| 4,704,051 A | 11/1987 | Ellingvag |
| 4,752,012 A | 6/1988 | Juergens |
| 4,776,521 A | 10/1988 | Weder et al. |
| 4,788,440 A | 11/1988 | Pryor |
| 4,816,043 A | 3/1989 | Harrison |
| 4,852,690 A | 8/1989 | Salmi |
| 4,893,757 A | 1/1990 | Weder et al. |
| 5,038,975 A | 8/1991 | Weder et al. |
| 5,233,200 A | 8/1993 | DiMarcello et al. |
| 5,238,707 A | 8/1993 | Weder et al. |
| 5,255,150 A | 10/1993 | Young et al. |
| 5,336,156 A | 8/1994 | Miller et al. |
| 5,340,608 A | 8/1994 | Weder et al. |
| 5,741,426 A | 4/1998 | McCabe et al. |
| 5,867,404 A | 2/1999 | Bryan |
| 5,956,664 A | 9/1999 | Bryan |
| 5,972,062 A | 10/1999 | Zimmermann |
| 5,987,979 A | 11/1999 | Bryan |
| 6,044,698 A | 4/2000 | Bryan |
| 6,245,218 B1 | 6/2001 | Gibson et al. |
| 6,348,146 B1 | 2/2002 | Gibson et al. |
| 6,388,612 B1 | 5/2002 | Neher |
| 6,392,565 B1 | 5/2002 | Brown |
| 6,650,451 B1 | 11/2003 | Byers et al. |
| 6,679,489 B2 | 1/2004 | Casto et al. |
| 6,819,258 B1 | 11/2004 | Brown |
| 6,838,998 B1 | 1/2005 | Brown et al. |
| 6,876,099 B2 | 4/2005 | Wobben |
| 7,124,631 B2 | 10/2006 | Wobben |
| 7,317,260 B2 | 1/2008 | Wilson |
| 7,337,726 B2 | 3/2008 | Wobben |
| 7,551,130 B2 | 6/2009 | Altenschulte |
| 7,581,360 B2 | 9/2009 | Olsen |
| 7,621,843 B2 | 11/2009 | Madge et al. |
| 7,755,210 B2 | 7/2010 | Kammer et al. |
| 7,921,611 B2 | 4/2011 | Olsen |
| 7,942,629 B2 | 5/2011 | Shi et al. |
| 7,966,318 B2 | 6/2011 | Harshfield |
| 7,970,500 B2 | 6/2011 | Parra Carque |
| 8,058,740 B2 | 11/2011 | Altenschulte et al. |
| 8,155,920 B2 | 4/2012 | Egedal |
| 8,174,137 B2 | 5/2012 | Skaare |
| 8,210,811 B2 | 7/2012 | Loh et al. |
| 8,215,896 B2 | 7/2012 | Kooijman et al. |
| 8,225,559 B2 | 7/2012 | Olsen |
| D672,667 S | 12/2012 | Mix |
| 8,337,706 B2 | 12/2012 | McCabe |
| 8,366,389 B2 | 2/2013 | Hoffmann et al. |
| 8,387,675 B1 | 3/2013 | Vaninger et al. |
| 8,441,138 B2 | 5/2013 | Gjerlov et al. |
| 8,489,247 B1 | 7/2013 | Engler |
| 8,516,114 B2 | 8/2013 | Banavar et al. |
| 8,546,967 B2 | 10/2013 | Ormel et al. |
| 8,606,418 B1 | 12/2013 | Myers et al. |
| 8,691,097 B2 | 4/2014 | McCabe |
| 8,720,127 B2 | 5/2014 | Olsen |
| 8,783,326 B1 | 7/2014 | Vaninger et al. |
| 8,881,485 B2 | 11/2014 | Sritharan et al. |
| 8,915,709 B2 | 12/2014 | Westergaard |
| 8,949,420 B2 | 2/2015 | Banavar et al. |
| 9,016,012 B1 | 4/2015 | Sritharan et al. |
| 9,192,879 B2 | 11/2015 | McCabe |
| 9,212,031 B2 | 12/2015 | Schneider et al. |
| 9,290,095 B2 | 3/2016 | Roth |
| 9,454,859 B2 | 9/2016 | Roth |
| 9,522,809 B2 | 12/2016 | Conquest et al. |
| 9,546,499 B2 | 1/2017 | Olsen |
| 9,567,978 B2 | 2/2017 | Marwaha et al. |
| 9,579,655 B2 | 2/2017 | DeJohn et al. |
| 9,587,629 B2 | 3/2017 | Desphande et al. |
| 9,605,558 B2 | 3/2017 | Perley et al. |
| 9,624,905 B2 | 4/2017 | Perley et al. |
| 9,631,606 B2 | 4/2017 | Slack et al. |
| 9,637,139 B2 | 5/2017 | Kathan et al. |
| 9,644,606 B2 | 5/2017 | Agarwal et al. |
| 9,644,608 B2 | 5/2017 | Blom et al. |
| 9,702,345 B2 | 7/2017 | Guadayol Roig |
| 9,751,790 B2 | 9/2017 | McCabe et al. |
| 9,759,068 B2 | 9/2017 | Herrig et al. |
| 9,777,711 B2 | 10/2017 | Rossetti |
| 9,810,199 B2 | 11/2017 | Hammerum |
| 9,822,762 B2 | 11/2017 | Kooijman et al. |
| 9,863,402 B2 | 1/2018 | Perley et al. |
| 9,879,654 B2 | 1/2018 | Peiffer et al. |
| 9,909,569 B2 | 3/2018 | Hammerum et al. |
| 9,909,570 B2 | 3/2018 | Klitgaard et al. |
| 9,926,911 B2 | 3/2018 | Butterworth et al. |
| 9,949,701 B2 | 4/2018 | Meyer et al. |
| 10,006,443 B1 | 6/2018 | Vorobieff et al. |
| 10,023,443 B2 | 7/2018 | Herse et al. |
| 10,036,692 B2 | 7/2018 | Perley et al. |
| 10,047,722 B2 | 8/2018 | Vaddi et al. |
| 10,047,726 B2 | 8/2018 | Sakaguchi |
| 10,087,051 B2 | 10/2018 | Assfalg et al. |
| 10,094,135 B2 | 10/2018 | Olsen |
| 10,155,587 B1 | 12/2018 | Tang |
| 10,184,450 B2 | 1/2019 | Wilson et al. |
| 10,184,456 B2 | 1/2019 | Liu et al. |
| 10,215,157 B2 | 2/2019 | Perley et al. |
| 10,257,592 B2 | 4/2019 | Brinker et al. |
| 10,267,293 B2 | 4/2019 | Peiffer et al. |
| 10,294,923 B2 | 5/2019 | Kristoffersen |
| 10,323,192 B2 | 6/2019 | Quanci et al. |
| 10,328,960 B2 | 6/2019 | Fifield |
| 10,385,826 B2 | 8/2019 | Butterworth et al. |
| 10,410,487 B2 | 9/2019 | Joseph |
| 10,457,893 B2 | 10/2019 | Ure et al. |
| 10,495,060 B2 | 12/2019 | Caruso et al. |
| 10,605,232 B2 | 3/2020 | Aderhold et al. |
| 10,634,120 B2 * | 4/2020 | Landa .................. F03D 7/0296 |
| 10,767,628 B2 * | 9/2020 | Hovgaard .............. G05B 17/02 |
| 11,199,175 B1 * | 12/2021 | Landa .................... F03D 13/20 |
| 11,242,841 B2 | 2/2022 | Landa et al. |
| 2004/0057828 A1 | 3/2004 | Bosche |
| 2009/0090815 A1 | 4/2009 | Massimo |
| 2009/0263245 A1 | 10/2009 | Shi et al. |
| 2010/0126115 A1 | 5/2010 | Lim et al. |
| 2010/0133827 A1 | 6/2010 | Huang et al. |
| 2010/0140936 A1 | 6/2010 | Benito et al. |
| 2010/0140940 A1 | 6/2010 | Krammer et al. |
| 2010/0143128 A1 | 6/2010 | McCorkendale |
| 2011/0140420 A1 | 6/2011 | Loh et al. |
| 2011/0144815 A1 | 6/2011 | Neumann |
| 2013/0287567 A1 | 10/2013 | Olesen et al. |
| 2013/0287568 A1 | 10/2013 | Miranda |
| 2014/0003936 A1 | 1/2014 | Agarwal et al. |
| 2014/0241878 A1 | 8/2014 | Herrig et al. |
| 2014/0328678 A1 | 11/2014 | Guadayol Roig |
| 2015/0308416 A1 | 10/2015 | Ambekar et al. |
| 2015/0322925 A1 | 11/2015 | Klitgaard et al. |
| 2016/0146190 A1 | 5/2016 | Ravindra et al. |
| 2016/0222946 A1 | 8/2016 | Krings |
| 2016/0333854 A1 | 11/2016 | Lund et al. |
| 2016/0356266 A1 | 12/2016 | Koerber et al. |
| 2017/0306926 A1 | 10/2017 | Deshpande et al. |
| 2017/0335827 A1 | 11/2017 | Wilson et al. |
| 2018/0187446 A1 | 7/2018 | Homsi |
| 2018/0372886 A1 | 12/2018 | Weber et al. |
| 2019/0072071 A1 | 3/2019 | Hammerum et al. |
| 2019/0203698 A1 | 7/2019 | Muller et al. |
| 2020/0025174 A1 | 1/2020 | Landa et al. |
| 2020/0088165 A1 | 3/2020 | Nielsen et al. |
| 2020/0124030 A1 | 4/2020 | Egedal et al. |
| 2021/0246871 A1 | 8/2021 | Fu et al. |
| 2021/0246875 A1 | 8/2021 | Fu et al. |
| 2021/0277869 A1 | 9/2021 | Vasudevan et al. |
| 2023/0349363 A1 * | 11/2023 | Skafte .................... F03D 7/042 |

FOREIGN PATENT DOCUMENTS

| | | |
|---|---|---|
| CN | 107630794 A | 1/2018 |
| CN | 107956638 A | 4/2018 |
| CN | 110500238 B | 6/2020 |
| CN | 112696317 A | 4/2021 |

(56) References Cited

FOREIGN PATENT DOCUMENTS

| | | |
|---|---|---|
| DE | 102010021643 A1 | 12/2011 |
| DE | 102016117191 A1 | 3/2018 |
| EP | 2466255 A1 | 6/2012 |
| EP | 2306007 B1 | 11/2013 |
| EP | 2767710 A2 | 8/2014 |
| EP | 2263126 B1 | 10/2014 |
| EP | 2063110 B1 | 8/2015 |
| EP | 2599993 B1 | 4/2016 |
| EP | 3263889 A1 | 1/2018 |
| EP | 3343300 A1 | 7/2018 |
| WO | WO2017/174090 A1 | 10/2017 |
| WO | WO2017198481 A1 | 11/2017 |
| WO | WO2018050596 A1 | 3/2018 |
| WO | WO 2018107298 | 6/2018 |
| WO | WO 2019110624 | 6/2019 |
| WO | WO2020011323 A1 | 1/2020 |

OTHER PUBLICATIONS

De Vries, Seawind Steps up Development of Radical Two-Blade Offshore Turbine, Windpower Monthly, Netherlands, Apr. 1, 2020, 13 Pages. Retrieved Mar. 10, 2022 from webpage: https://www.windpowermonthly.com/article/1678312/seawind-steps-development-radical-two-blade-offshore-turbine.

Envision Energy, Wind Power Projects, Envision Energy Commissions 2 Wind Projects in Gujarat, 2 Pages. Retrieved Mar. 10, 2022 from webpage: https://economictimes.indiatimes.com/small-biz/productline/power-generation/envision-energy-commissions-2-wind-projects-in-gujarat/articleshow/73578179.cms?from=mdr.

Lee, Goldwind Could Be Global Number-One in Turbine Deliveries This Year: Official, Recharge Global News and Intelligence for the Energy Transition, Jun. 26, 2020, 2 Pages. Retrieved Mar. 10, 2022 from webpage: https://www.rechargenews.com/wind/goldwind-could-be-global-number-one-in-turbine-deliveries-this-year-official/2-1-833674.

NEO-M8P Series, u-blox, u-blox M8 High Precision GNSS Modules. https://www.u-blox.com/en/product/neo-m8p-series.

Petrova, Enercon Grabs Turbine Order for 222.6-MW German Wind Portfolio, Renewables Now, Jul. 10, 2020, 3 Pages. Retrieved Mar. 10, 2022 from webpage: https://renewablesnow.com/news/enercon-grabs-turbine-order-for-2226-mw-german-wind-portfolio-705940/.

Reve, Siemens Gamesa Leads the Way in India with the Launch of its Next Generation Wind Turbine, Evwind, News Menu, Uncategorized Wind Energy, Wind Energy, Jul. 10, 2020, 3 Pages. Retrieved Mar. 10, 2022 from webpage: https://www.evwind.es/2020/07/10/siemens-gamesa-leads-the-way-in-india-with-the-launch-of-its-next-generation-wind-turbine/75701.

Tordal, Sondre et al., Inverse Kinematic Control of an Industrial Robot used in Vessel-to-Vessel Motion Compensation, 2017 25th Mediterranean Conference on Control and Automation (MED), Valletta, Malta, Jul. 3-6, 2017, pp. 1392-1397.

Web Page Only https://www.researchgate.net/profile/Mohd_Hafiz_Yahya/publication/261841729/figure/fig1/AS:3924 98989027332@1470590459207/RTK-GPS-Overview_W640.jpg.

Wikipedia, Real-Time Kinematic (Web Page Only) https://en.wikipedia.org/wiki/Real-time_kinematic.

Wind Doctor, NTN, Condition Monitoring System for Wind Turbines, Cat.No. 8406-III/E, 2019, 5 Pages. Retrieved Mar. 10, 2022 from webpage: https://www.ntnglobal.com/en/products/catalog/pdf/8406E.pdf.

Wohlert, Measuring Rotor Blades with Lasers, Reducing Wear on Wind Turbines, WindTech International, vol. 12, No. 4, Jun. 2016, 4 Pages.

The EP Search Report for EP application No. 23165271.0, Aug. 4, 2023, 7 pages.

* cited by examiner

METHOD AND SYSTEM FOR DETERMINING AND TRACKING WIND TURBINE TOWER DEFLECTION

FIELD

The present subject matter relates generally to wind turbine towers and, more particularly, to a method and system to track deflection of the wind turbine tower.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

As hub sizes and heights continue to increase along with size and capacity of wind turbines, the steel tower that supports the hub becomes an increasingly critical component. A key consideration to the integrity of the wind turbine is the tower deflection as it influences mechanical reaction loads, blade tip clearance, and life cycle fatigue. In addition, the monitoring and tracking of tower deflections is a useful tool for operational control of mechanical loads and power capture.

The top of the tower during a no-load or idle state behaves as a neutral pivot point, which is a deflection-free position of the tower top about which the nacelle (including the machine head and rotor) rotates. Over time, the loads and other conditions affecting the tower mentioned above may cause this pivot point to deflect in a fore-aft, side-to-side, or torsional manner. Long-time variations in the pivot point (which may be permanent deflections) are an indication of tower structure and/or foundation changes over time. Short-time variations in the pivot point are an indication of oscillatory motion of the tower from rotor and/or drive train loads.

Motion of the tower top is difficult to model or infer and use reliably in feedback control for a wind turbine. Key factors of operational concern for tower deflection monitoring are rotor thrust, maximum deflection (fore-aft, side-to-side), and dynamic coupling of frequency modes. Current methods for monitoring rotor thrust represent the blades on a wind turbine in a nominal and idealized operating condition. However, variability in blade aerodynamics and system interactions result in variation in structural loading and power performance, both critical to wind turbine operability. Tower deflection is an indicator of rotor loading and provides a means of observing variation in rotor performance, sub-optimal turbine operation, and other conditions that may require maintenance/repair.

It would be desirable to accurately detect and track deflection of the wind turbine tower via establishment of a known geographic reference position for the tower top pivot point or other fixed location relative to the tower (e.g., a fixed location on the tower top or the nacelle) and to track changes in this position over time. This information would be useful for monitoring the integrity of the steel structure and tower foundation and for control and management of structural and operational loads that may cause deflection and decrease the life of the tower and other wind turbine components. Modeling methods can be applied utilizing the deflections of the tower top pivot point or other fixed location to determine the fore/aft and side-to-side deflections of the tower top and the associated reactionary loads.

The present invention provides a solution for accurately determining the tower top pivot point for a wind turbine tower.

BRIEF DESCRIPTION

Aspects and advantages of the invention will be set forth in part in the following description, or may be obvious from the description, or may be learned through practice of the invention.

In one aspect, the present disclosure is directed to a method for determining deflection of a tower of a wind turbine, the wind turbine including a nacelle with a machine head and a rotor atop of the tower. The method includes establishing a fixed location relative to the tower, and then detecting a total deflection of a geographic location ("geo-location") of the fixed location. The method then determines components of the total deflection that are generated by non-thrust loads acting on the tower. The deflection components from the non-thrust loads are subtracted from the total deflection to determine a thrust loads deflection component corresponding to deflection of the tower from operational thrust loads on the rotor.

In a particular embodiment, the thrust loads deflection component is used directly as a control variable for performing one or more of: changing an operating parameter of the wind turbine based on a difference between an expected thrust loads deflection component and the determined thrust loads deflection component; performing a repair or maintenance procedure based on a difference between the expected thrust loads deflection component and the determined thrust loads deflection component; determining tower or foundation integrity; or making a tower or foundation life prediction, based on a difference between the expected thrust loads deflection component and the determined thrust loads deflection component.

In a certain embodiment, the method may include, from the thrust loads deflection component, determining the rotor thrust resulting from operational loads acting on the rotor, and comparing the determined rotor thrust to an expected rotor thrust for operating conditions of the wind turbine. This embodiment of the method may include performing at least one of: changing an operating parameter of the wind turbine based on a difference between the expected rotor thrust and the determined rotor thrust; performing a repair or maintenance procedure based on a difference between the expected rotor thrust and the determined rotor thrust; or determining tower or foundation integrity, or making a tower or foundation life prediction, based on a difference between the expected rotor thrust and the determined rotor thrust.

The steps of determining and subtracting the non-thrust loads deflection components from the total deflection of the fixed location may include generating and applying a tower displacement correction factor to a vector of the total deflection prior to determining the geo-location of the fixed location. This tower distortion correction factor may correct for tower displacement caused by any one or combination of: weight overhang of the nacelle relative to a vertical axis of the tower; thermal tower distortion caused by temperatures differences between sides of the tower; or tower distortion from transient loads placed on the tower or nacelle.

In a particular embodiment, the step of detecting the total deflection of the geo-location of the fixed location may include: (a) configuring at least one rover receiver of a global navigation satellite system (GNSS) at a fixed position on the nacelle or on the tower; (b) based on a GNSS geo-location of the rover receiver and a known position of the fixed location relative to the rover receiver, computing, via the controller, the geo-location of the fixed position; and (c) repeating steps (a) through (b) at least once more over a fixed time period and determining a total trajectory or displacement vector of the fixed location over the time period that represents the total deflection of the tower. With this embodiment, the rover receiver may be in communication with a fixed base station receiver that transmits correction data to the rover receiver, wherein the GNSS geo-location of the rover is determined relative to the base station.

The GNSS geo-location of the rover receiver may be an absolute global latitude and longitude position supplied directly to the rover receiver.

In a certain embodiment, the fixed location relative to the tower corresponds to a tower top pivot point (TPP) of the tower, wherein the step of detecting the total deflection of the geo-location of the TPP of the tower may include: (a) configuring at least one rover receiver of a global navigation satellite system (GNSS) at a fixed position on the nacelle; (b) conducting a plurality of 360-degree yaw sweeps of the nacelle and recording geo-location signals received by the rover receiver during the yaw sweeps; (c) via a controller, converting the geo-location signals into a circular plot and determining a radius of the circular plot, the radius being a distance between the rover receiver and the TPP; (d) based on a GNSS geo-location of the rover receiver and the radius, computing, via the controller, the geo-location of the TPP; and (e) repeating steps (b) through (d) at least once more over a fixed time period and determining a total trajectory or displacement vector of the TPP over the time period that represents the total deflection of the tower.

In this embodiment, the steps of determining and subtracting the non-thrust loads deflection components from the total deflection may include generating and applying a tower displacement correction factor to the radius from the yaw sweeps prior to determining the geo-location of the TPP. The tower distortion correction factor corrects for tower displacement caused by any one or combination of: weight overhang of the nacelle relative to a vertical axis of the tower; thermal tower distortion caused by temperatures differences between sides of the tower; or tower distortion from transient loads placed on the tower or nacelle.

Also with this embodiment, the plurality of 360-degree yaw sweeps may include at least one yaw sweep in a positive direction and at least one yaw sweep in an opposite negative direction. In addition, the plurality of 360-degree yaw sweeps may be conducted during low wind speeds so as to minimize transient wind loads that may cause deflection of the tower during the yaw sweeps.

The method may include locating the rover receiver atop and at a back end of the nacelle at a predetermined fixed distance ("x") to a centerline axis of the nacelle, wherein the geo-location of the TPP along the centerline axis is computed based on the radius of the yaw sweeps and the distance "x". A plurality of the rover receivers may be configured on the nacelle, wherein the location signals from the rover receivers are used to generate the circular plot and determine the radius for each of the rover receivers.

The invention also encompasses a system for determining deflection of a tower of a wind turbine, the wind turbine including a nacelle with a machine head and a rotor atop of the tower. The system includes at least one rover receiver of a global navigation satellite system (GNSS) configured at a fixed position on the nacelle or on the tower. A controller is in communication with the rover receiver, the controller configured to perform the following operations: detecting a total deflection of a geographic location ("geo-location") of a fixed location on the tower; determining components of the total deflection that are generated by non-thrust loads acting on the tower; and subtracting the non-thrust loads deflection components from the total deflection to determine a thrust loads deflection component corresponding to deflection of the tower from operational thrust loads on the rotor.

The controller may be further configured to: (a) based on a GNSS geo-location of the rover receiver and a known position of the fixed location relative to the rover receiver, compute the geo-location of the fixed location; and (b) repeat step (a) at least once more over a fixed time period and determining a total trajectory or displacement vector of the fixed location over the time period that represents the total deflection of the tower.

In particular embodiment of the system, the rover receiver is at a fixed position on the nacelle and the fixed location corresponds to a tower top pivot point (TPP) of the tower. In this embodiment, the controller may be configured to: (a) receive and record geo-location signals from the rover receiver during a plurality of 360-degree yaw sweeps of the nacelle; (b) convert the geo-location signals into a circular plot and determining a radius of the circular plot, the radius being a distance between the rover receiver and the TPP; (c) based on a GNSS geo-location of the rover receiver and the radius, compute the geo-location of the TPP; and (d) repeating steps (a) through (c) at least once more over a fixed time period and determining a total trajectory or displacement vector of the TPP over the time period that represents the total deflection. The controller may be further configured to apply a tower displacement correction factor to the radius from the yaw sweeps based on one or more of: weight overhang of the nacelle relative to a vertical axis of the tower; thermal tower distortion caused by temperatures differences between sides of the tower; and tower displacement from transient loads placed on the tower or nacelle.

The invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
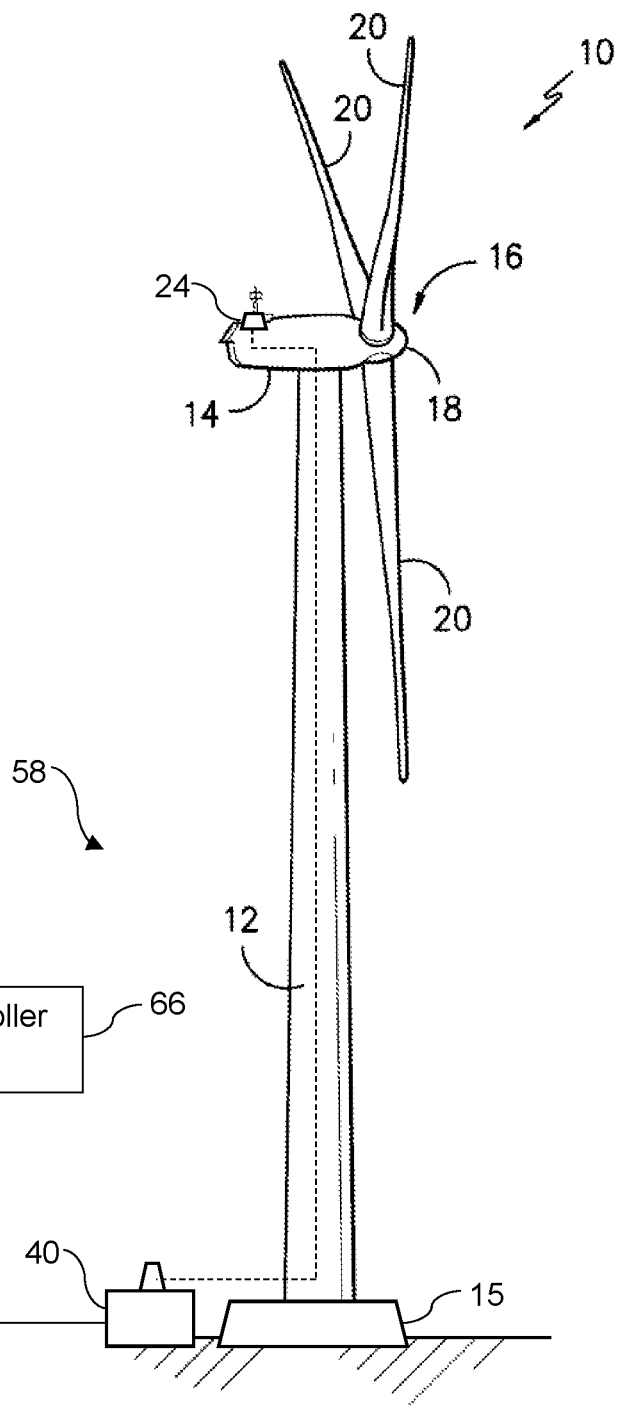
FIG. 1 illustrates a perspective view of one embodiment of a wind turbine configured with a system and method in accordance with the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a method and associated system for determining and tracking a geographic location of a fixed location relative to a wind turbine tower in order to determine deflection of the tower. In a particular embodiment, the fixed location corresponds to a pivot point that is essentially a neutral deflection-free position of the tower top about which the nacelle (including the machine head and rotor) rotates. As described herein, the location and deflection of this tower top pivot point (TPP) provides valuable information for purposes of analyzing and correcting for permanent and transient distortions of the tower.

Referring now to the drawings, FIG. 1 illustrates a perspective view of one embodiment of a wind turbine 10 configured with a system 58 for practicing various methods according to the present disclosure. As shown, the wind turbine 10 generally includes a tower 12, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or fewer than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotationally coupled to an electric generator positioned within the nacelle 14 to permit electrical energy to be produced.

For purposes of the present disclosure, the term "nacelle" is used herein to include machine head components (e.g., drive train components, generator, etc.) located within the nacelle housing and the hub 18 components.

Figure 2:
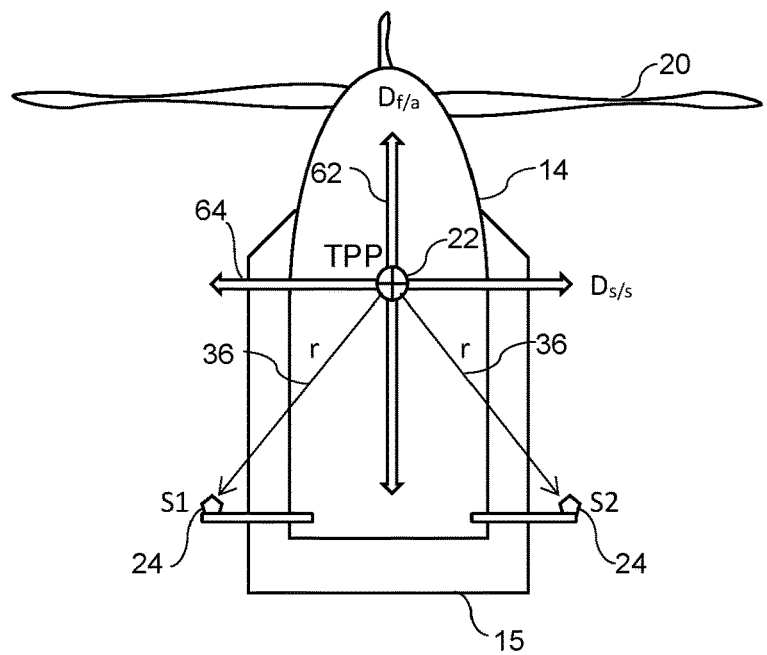
FIG. 2 is a diagram view of a nacelle configured with sensors to carry out method embodiments of the invention.

Referring to FIGS. 1 and 2, at least one rover receiver 24 of a global navigation satellite system (GNSS) is mounted at a fixed, predetermined position on the nacelle 14. The rover receiver 24 is in direct or indirect communication with a controller 66. In the depicted embodiment, the rover receiver 24 is also in communication with a fixed base station 40, as described in greater detail below. The controller 66 may be a local controller associated with a single wind turbine 10, a farm-level controller associated with a plurality of wind turbines 10 within a wind farm, or a remote controller located, for example, in a remote control/monitoring facility. The controller 66 is configured to carry out various processes, as described in greater detail below, for determining the geo-location of the TPP 22 of the wind turbine tower 12.

Figure 8:
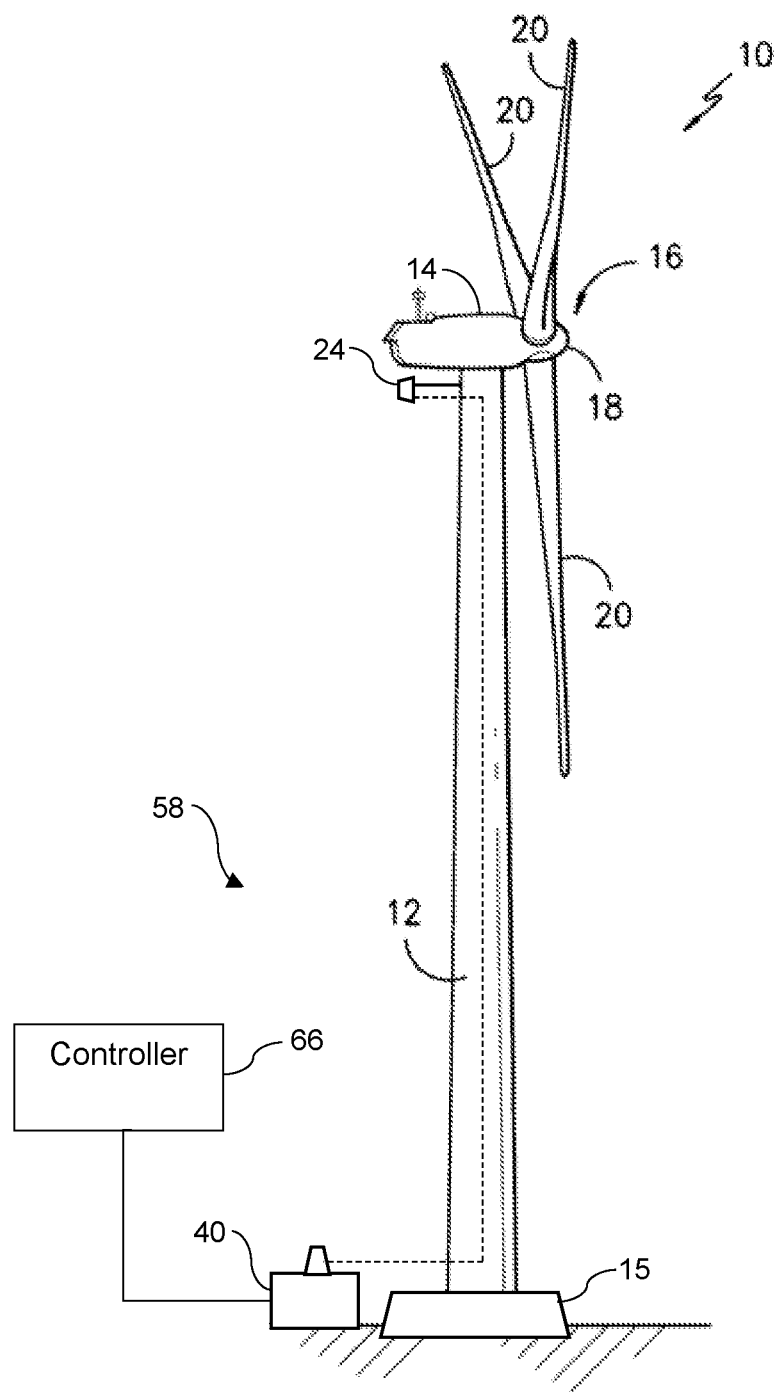
FIG. 8 is a perspective view of an alternative embodiment of a wind turbine configured with a system and method in accordance with the present invention.

In an alternate embodiment of the wind turbine 10 depicted in FIG. 8, one or more of the rover receivers 24 are mounted at fixed position on the tower 12, desirably at or near the top of the tower 12.

The GNSS system may utilize any of the available satellite-based positioning systems, such as GPS, GLONASS, Galileo, NavIC, and BeiDou. In certain embodiments, the GNSS system may also employ real-time kinematic (RTK) techniques to enhance the precision of the position data derived from the GNSS system. RTK techniques are known to those-skilled in the art. In general, the distance between a satellite navigation receiver (the rover receiver 24) and a satellite can be calculated from the time it takes for a signal to travel from the satellite to the receiver. The accuracy of the resulting range measurement is a function of the receiver's ability to accurately process signals from the satellite, as well as additional error sources such as non-mitigated ionospheric and tropospheric delays, multipath, satellite clock, and ephemeris errors, etc.

RTK techniques use the satellite signal's carrier wave as its signal. RTK uses a fixed base station 40 and the rover 24 to transmit correction data to the rover receiver 24 and reduce the rover's position error. The base station 40 re-broadcasts the phase of the carrier that it observes, and the rover 24 compares its own phase measurements with the one received from the base station. This allows the rover receiver 24 to calculate its relative position with respect to the base station 40 with a high degree of accuracy (typically within millimeters). The accuracy of the geo-location of the rover receiver 24 is thus essentially the same accuracy as the computed position of the base station 40. In essence, the base station 40 is located at a known surveyed location (a benchmark position) and the rover receiver 24 takes a fix relative to the base station 40.

The rover receivers 24 may also be configured with Inertial Navigation System (INS) capability and include inertial navigation elements (e.g., accelerometers, gyros). This on-board INS capability may improve kinematic accuracy (position, velocity, & rotation) by reducing measurement variability at a much higher sample rate.

As mentioned, alternatively, the geo-location of the rover receiver 24 may be based on the absolute global latitude and longitude position supplied directly to the rover from the GNSS satellite(s).

Figure 4:
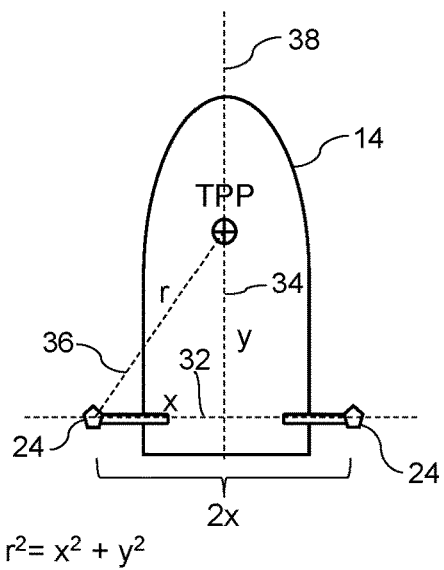
FIG. 4 is a diagram view depicting further method steps according to an embodiment of the invention.

Referring to the embodiment of FIGS. 2 and 4, the rover receiver 24 can be located atop and at a back end of the nacelle 14 at a predetermined fixed distance 32 ("x") to a centerline axis 38 of the nacelle. The rover receiver 24 may be mounted so as to extend outboard from the sides of the nacelle 14, as depicted in the figures. For purposes of determining the geo-location of the TPP 22 (in one embodiment of the method) based on the GNSS geo-location of the rover receiver 24, it is reasonably assumed that the TPP 22 lies on (or within an acceptable margin from) the centerline 38 of the nacelle 14.

Figure 9:
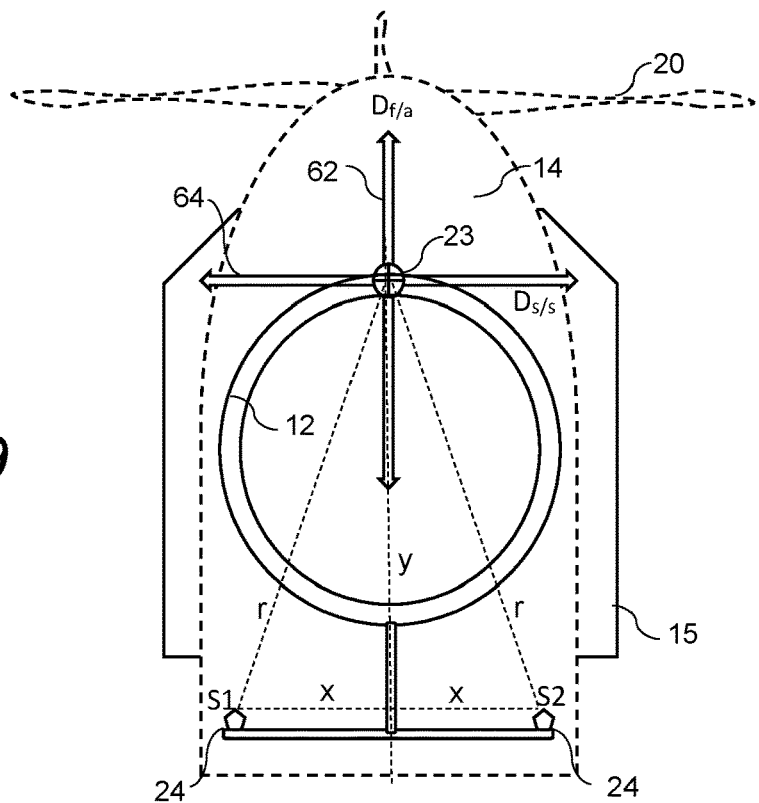
FIG. 9 is a diagram view of a tower configured with sensors to carry out alternate method embodiments of the invention.
Figure 10:
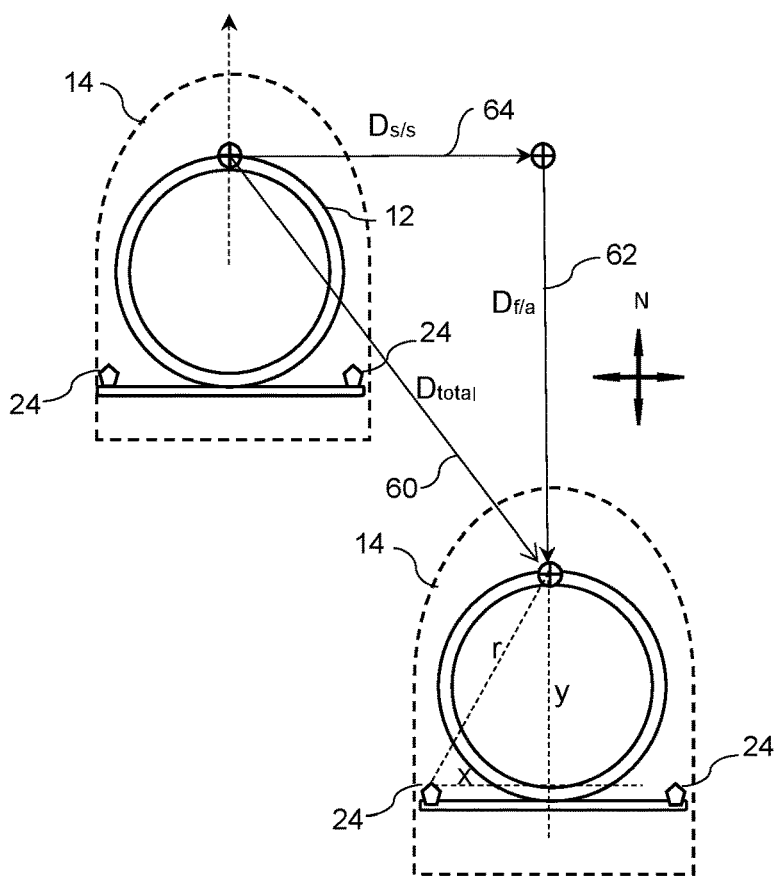
FIG. 10 is a diagram view depicting method steps according to an embodiment of the invention.

In the alternate embodiment depicted in FIGS. 9 and 10, the rover receivers 24 are mounted to frame members attached near or at the top of the tower 12. These rover receivers 24 are at known values of length/distance "r", "x", and "y" relative to a fixed location 23 on the tower 12, which may lie on the line "y" that is at the midpoint "X" distance between the rover receivers 24. The relative position of the fixed location 23 with respect to the rover receivers 24 is thus a known, non-varying spatial value.

Figure 3:
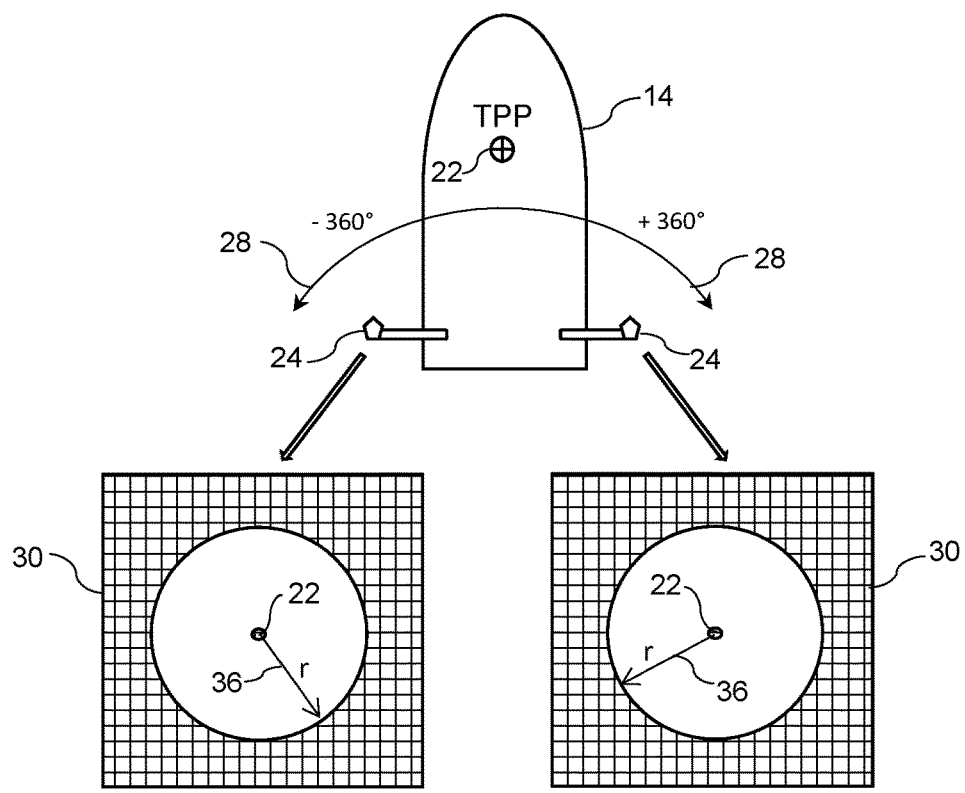
FIG. 3 is a diagram view depicting method steps according to an embodiment of the invention.

In the embodiment of FIGS. 2 through 4, the fixed location corresponds to the TPP 22, which must be determined. As depicted in FIG. 3, one method to determine location of the TPP 22 includes conducting a plurality of 360-degree yaw sweeps 28 of the nacelle 14 and recording the geo-location signals received by the rover receiver 24 during the yaw sweeps 28. The plurality of 360-degree yaw sweeps 28 may include one or more yaw sweeps 28 in a positive direction and one or more yaw sweeps 28 in an opposite negative direction. The 360-degree yaw sweeps should be done under low wind speed conditions.

The controller 66 converts the geo-location signals of the rover receiver 24 into a circular plot 30 and determines a radius "r" 36 of the circular plot. This radius 36 corresponds to the distance from the rover receiver 24 to the TPP 22 of the wind turbine tower 12. The controller 66 then uses the length of the radius 36 and the geo-location of the rover receiver 24 to compute a geo-location of the TPP 22. For example, referring to FIG. 4, knowing the distance "x" 32 of the rover receiver 24 from the centerline axis 38 of the nacelle 14 and with the assumption that the TPP lies on the centerline axis 38 at a distance "y" 34 from the line of "x" 32, the length of "y" 34 is readily solved using the relationship for a right-triangle: $r^2=x^2+y^2$. With the values of "x" and "y" determined, the precise geo-location of TPP 22 relative to the geo-location of the rover receiver 24 is then easily determined. The latitude and longitude changes (x and y) to a known geo-location of the rover receiver 24 will give the geo-location of the TPP.

Figure 7:
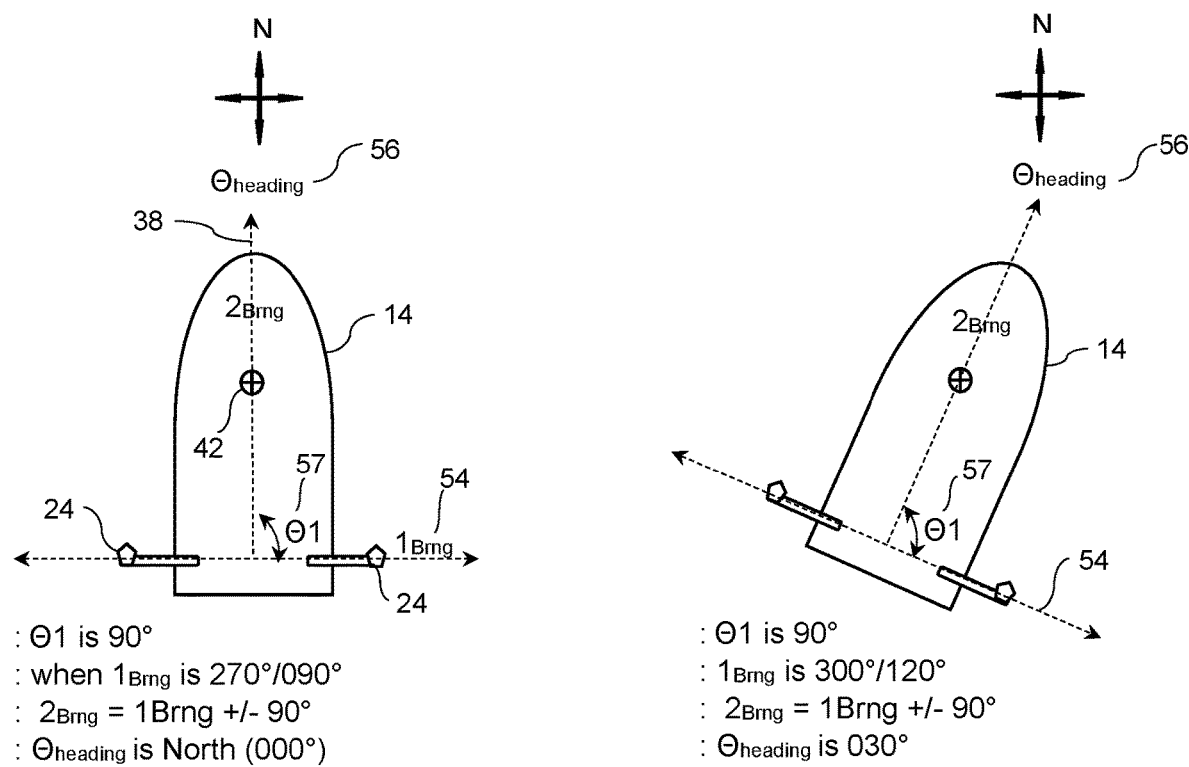
FIG. 7 is a diagram view depicting still other method steps according to an embodiment of the invention.

Referring to FIG. 7, generation of the yaw sweeps 28 with two or more of the rover receivers 24 on the nacelle 14, for example two rover receivers 24 at opposite sides of and at a same or different distance "x" from the centerline axis 38 of the nacelle 14, is depicted. The geo-location signals from both of the rover receivers 24 can be used to generate circular plots 30 and determine the radius 36 of the yaw sweeps 28 (FIG. 3). When the distance "x" is the same for each rover, the respective plots 30 should have the same radius 36. A smaller or larger distance "x" will produce a smaller or larger radius plot, respectively. The different radius plots 30 can be used to independently determine the TPP, which provides an accuracy check of the system.

In the embodiment of FIGS. 9 and 10, the values of "x" and "y" are simply measured. The latitude and longitude changes (x and y) to the known geo-location of the rover receiver 24 will give the geo-location of the fixed location 22 on the tower.

Figure 6:
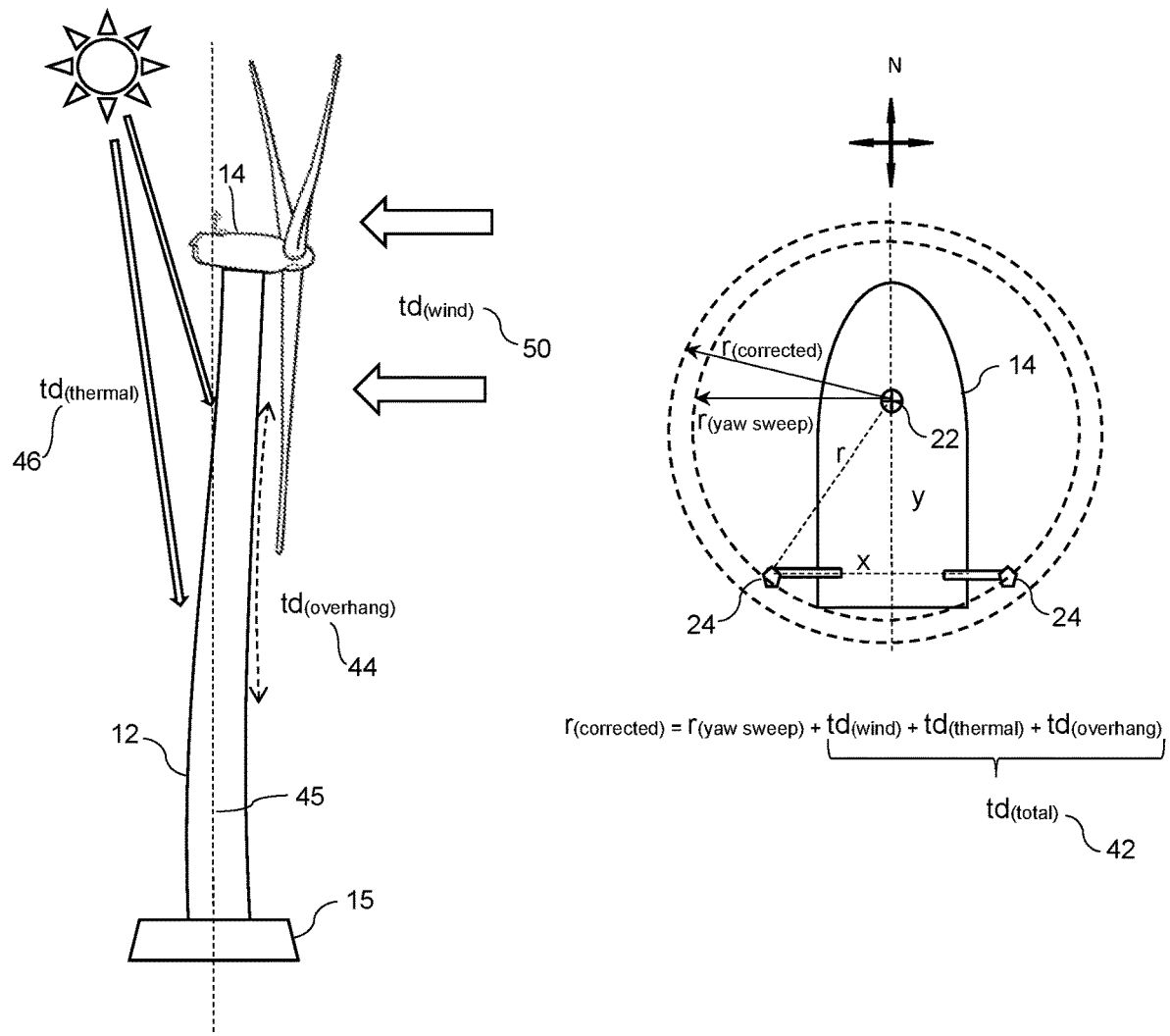
FIG. 6 is a diagram view depicting more method steps according to an embodiment of the invention.

Referring to FIG. 6, certain "non-thrust load" factors acting on the tower 12 can produce permanent or transient distortions in the tower 12 that contribute to the total deflection of the tower. These factors are considered as "non-thrust loads" in that they are not the result of thrust or forces exerted on the tower via power production of the rotor. For purposes of the present invention, it is desired to determine components of the total tower deflection that are attributed to the non-thrust loads or influences and to remove or subtract these non-thrust load deflection components from the total deflection component in order to determine deflection of the tower due solely to operational thrust loads acting on the rotor.

Examples of the non-thrust loads acting on the tower include (but are not necessarily limited to): weight overhang of the nacelle relative to a vertical axis of the tower; thermal tower distortion caused by temperatures differences between sides of the tower; or tower distortion from transient loads placed on the tower or nacelle.

A "clean" value of tower deflection (e.g., the thrust loads deflection component of the total deflection) void of the non-thrust load deflection components can be used as a control variable for various operational conditions of the wind turbine. For example, the thrust loads deflection component may be used directly as a control variable for performing one or more of: changing an operating parameter of the wind turbine based on a difference between an expected thrust loads deflection component and the determined thrust loads deflection component; performing a repair or maintenance procedure based on a difference between the expected thrust loads deflection component and the determined thrust loads deflection component; or determining tower or foundation integrity, or making a tower or foundation life prediction, based on a difference between the expected thrust loads deflection component and the determined thrust loads deflection component.

Alternatively, the thrust loads deflection component can be correlated to an actual rotor thrust resulting from operational loads acting on the rotor, which can then be used as a control variable by comparing the determined rotor thrust to an expected rotor thrust for operating conditions of the wind turbine. The determined rotor thrust can be used to perform any one or combination of: changing an operating parameter of the wind turbine based on a difference between the expected rotor thrust and the determined rotor thrust; performing a repair or maintenance procedure based on a difference between the expected rotor thrust and the determined rotor thrust; or determining tower or foundation integrity, or making a tower or foundation life prediction, based on a difference between the expected rotor thrust and the determined rotor thrust.

Referring to the embodiment of FIGS. 2-6, it can be appreciated that the non-thrust loads could affect the accuracy of the initial determination of the radius 36 of the yaw sweeps 28. For example, the center of mass of the nacelle 14 (including the machine head components and the hub 18) is typically not aligned with the centerline 45 of the nacelle 14, but overhangs towards the hub 18, thus creating a permanent moment arm on the tower 12. As the yaw sweeps 28 are conducted, the tower may continuously "lean" towards the hub 18 (indicated by the dashed arrow in FIG. 6). If this "lean" is not accounted for, the radius 36 of the yaw sweep 29 would be decreased by the amount of the "lean". The degree of the "lean" can be determined empirically or through modeling of the nacelle 14 and tower 12. An overhang tower distortion correction factor 44 ($td_{(overhang)}$) can be computed and applied to the radius 36 of the yaw sweep 28 to give a corrected radius 36.

Still referring to FIG. 6, temperature differences between sides of the tower 12 can result in a thermal distortion of the tower 12. The temperature differential resulting from solar heating of one side of the tower compared to the shaded side of the tower can cause expansion of the heated side and leaning of the tower towards the shaded side. The degree of thermal distortion can be determined empirically or through modeling and used to compute a thermal tower distortion correction factor 46 ($td_{(thermal)}$) that is applied to the radius 36 of the yaw sweep 28 to give a corrected radius 36.

Still referring to FIG. 6, transient loads on the nacelle 14 caused by wind can also result in distortion of the tower 12, causing the tower to lean away from the direction of the wind. The degree of wind load distortion can be determined empirically or through modeling and used to compute a wind tower distortion correction factor 50 ($td_{(wind)}$) that is applied to the radius 36 of the yaw sweep 28 to give a corrected radius 36.

All of the distortion correction factors 44, 46, and 50 can be combined into a total distortion factor 42 that is applied to the radius 36 of the yaw sweep 28 to give a corrected radius 36.

In the embodiment of FIGS. 9-10, the total distortion factor 42 can be applied as a vector correction to the total deflection vector $D_{total}$.

Referring to the embodiment of FIGS. 9-10, the step of detecting the total deflection of the geo-location of the fixed location 23 may include, based on the GNSS geo-location of the rover receiver 24 and a known position of the fixed location 23 relative to the rover receiver 24, computing, via the controller, the geo-location of the fixed position 23 (as discussed above). These steps of determining the geo-location of the of the fixed location 23 may be repeated one or more times over a fixed time period. Changes in the geo-location of the fixed position 23 over the time period corresponds to a total trajectory or displacement vector 60 of the fixed location 23 over the time period, which represents the total deflection of the tower 22. The total displacement vector 60 has a side-to-side component 64 and a fore-aft component 62. Multiple values of the geo-location for the fixed position 23 can be plotted, averaged, or otherwise manipulated to generate the total displacement vector 60 of FIG. 10.

The embodiment of FIG. 7 also enables computing of a heading bearing 56 of the nacelle 14. The heading bearing 56 can be used by the wind turbine control system for yaw control of the nacelle. The geo-location of the two rover receivers 24 is determined and a line through the two geo-locations provides a first bearing line 54. A fixed angle 57 (e.g., a 90-degree angle) between the bearing line 54 and the centerline axis 38 is added/subtracted to the bearing of line 54 to provide the bearing 56 of the centerline axis 38, which corresponds to the heading of the nacelle 14. For example, in the left-hand depiction of FIG. 7, the first bearing line 54 has a bearing of 270-degrees or 090-degrees and the fixed angle 57 is 90-degrees. The bearing of the centerline axis 38 corresponding to the heading of the nacelle is thus North)(000° (270-degrees+90-degrees or 090-degrees−90-degrees). The right-hand depiction is another illustration wherein the final heading 56 of the nacelle is determined the same way to be 030°.

Figure 5:
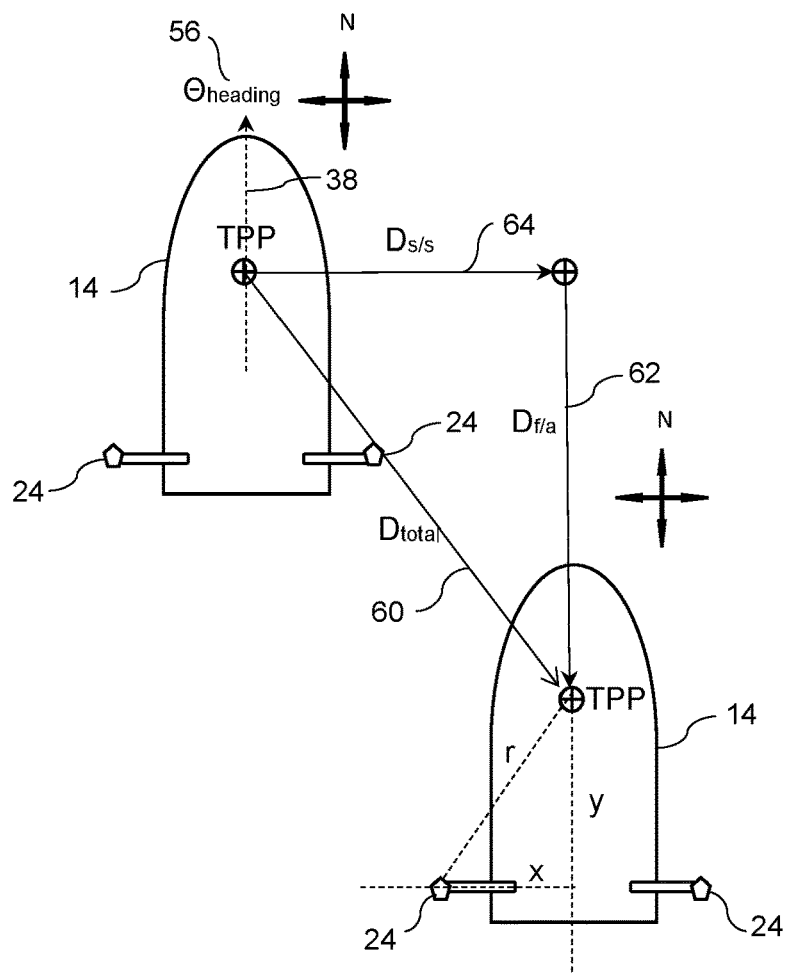
FIG. 5 is a diagram view depicting still other method steps according to an embodiment of the invention.

Referring to the embodiment of FIGS. 4-5 wherein the fixed location corresponds to the TPP, embodiments of the present method may also include determining the geo-location of the TPP as described above a plurality of times over a fixed time period and determining a total displacement trajectory of the TPP over the time period, which may be represented by a vector. The multiple TPP's form the total displacement trajectory which can be combined into a total displacement vector 60 for the monitored time period, the total displacement vector 60 having a side-to-side component 64 and a fore-aft component 62.

As mentioned above, the displacement of the TPP over time may be indicative of various factors affecting tower distortion as well as a reference for tower deflection measurements. TPP changes resulting from tower distortion may be the result of foundation settling, seismic movement, tower shell/flange relaxation, incipient structural failure, and others. Displacements of the tower from the load imparted to the tower from rotor, machine head, and environmental effects can be accurately measured and reported based on movement of the TPP. The total displacement vector 60 or displacement trajectory of TPP can be used for evaluating/determining various tower characteristics, including determination of tower integrity, tower life prediction (longevity), load management, tower maintenance, or changes in operating and maintenance procedures to reduce tower distortion. Based on any one or more of these characteristics, the method includes implementing control actions or procedures to counter any adverse effects on the tower or overall operation of the wind turbine.

Further aspects of the invention are provided by the subject matter of the following clauses:

Clause 1: A method for determining deflection of a tower of a wind turbine, the wind turbine including a nacelle with a machine head and a rotor atop of the tower, the method comprising: establishing a fixed location relative to the tower; detecting a total deflection of a geographic location ("geo-location") of the fixed location; determining components of the total deflection that are generated by non-thrust loads acting on the tower; and subtracting the non-thrust loads deflection components from the total deflection to determine a thrust loads deflection component corresponding to deflection of the tower from operational thrust loads on the rotor.

Clause 2: The clause according to clause 1, wherein the thrust loads deflection component is used directly as a control variable for performing one or more of changing an operating parameter of the wind turbine based on a difference between an expected thrust loads deflection component and the determined thrust loads deflection component; performing a repair or maintenance procedure based on a difference between the expected thrust loads deflection component and the determined thrust loads deflection component; or determining tower or foundation integrity, or making a tower or foundation life prediction, based on a difference between the expected thrust loads deflection component and the determined thrust loads deflection component.

Clause 3: The clause according to any one of clauses 1 through 2, further comprising, from the thrust loads deflection component, determining the rotor thrust resulting from operational loads acting on the rotor, and comparing the determined rotor thrust to an expected rotor thrust for operating conditions of the wind turbine.

Clause 4: The clause according to any one of clauses 1 through 3, further comprising performing at least one of: changing an operating parameter of the wind turbine based on a difference between the expected rotor thrust and the determined rotor thrust; performing a repair or maintenance procedure based on a difference between the expected rotor thrust and the determined rotor thrust; or determining tower or foundation integrity, or making a tower or foundation life prediction, based on a difference between the expected rotor thrust and the determined rotor thrust.

Clause 5: The clause according to any one of clauses 1 through 4, wherein the steps of determining and subtracting the non-thrust loads deflection components from the total deflection comprises generating and applying a tower displacement correction factor to a vector of the total deflection prior to determining the geo-location of the fixed location.

Clause 6: The clause according to any one of clauses 1 through 5, wherein the tower distortion correction factor corrects for tower displacement caused by any one or combination of: weight overhang of the nacelle relative to a vertical axis of the tower; thermal tower distortion caused by temperatures differences between sides of the tower; or tower distortion from transient loads placed on the tower or nacelle.

Clause 7: The clause according to any one of clauses 1 through 6, wherein the step of detecting the total deflection of the geo-location of the fixed location comprises: (a) configuring at least one rover receiver of a global navigation satellite system (GNSS) at a fixed position on the nacelle or on the tower; (b) based on a GNSS geo-location of the rover receiver and a known position of the fixed location relative to the rover receiver, computing, via the controller, the geo-location of the fixed position; and (c) repeating steps (a) through (b) at least once more over a fixed time period and determining a total trajectory or displacement vector of the fixed location over the time period that represents the total deflection of the tower.

Clause 8: The clause according to any one of clauses 1 through 7, wherein the rover receiver is in communication with a fixed base station receiver that transmits correction data to the rover receiver, wherein the GNSS geo-location of the rover is determined relative to the base station.

Clause 9: The clause according to any one of clauses 1 through 8, wherein the GNSS geo-location of the rover is an absolute global latitude and longitude position supplied directly to the rover.

Clause 10: The clause according to any one of clauses 1 through 9, wherein the fixed location corresponds to a tower top pivot point (TPP) of the tower, the step of detecting the total deflection of the geo-location of the TPP of the tower comprises: (a) configuring at least one rover receiver of a global navigation satellite system (GNSS) at a fixed position on the nacelle; (b) conducting a plurality of 360-degree yaw sweeps of the nacelle and recording geo-location signals received by the rover receiver during the yaw sweeps; (c) via a controller, converting the geo-location signals into a circular plot and determining a radius of the circular plot, the radius being a distance between the rover receiver and the TPP; (d) based on a GNSS geo-location of the rover receiver and the radius, computing, via the controller, the geo-location of the TPP; and (e) repeating steps (b) through (d) at least once more over a fixed time period and determining a total trajectory or displacement vector of the TPP over the time period that represents the total deflection of the tower.

Clause 11: The clause according to any one of clauses 1 through 10, wherein the steps of determining and subtracting the non-thrust loads deflection components from the total deflection comprises generating and applying a tower displacement correction factor to the radius from the yaw sweeps prior to determining the geo-location of the TPP.

Clause 12: The clause according to any one of clauses 1 through 11, wherein the tower distortion correction factor corrects for tower displacement caused by any one or combination of: weight overhang of the nacelle relative to a vertical axis of the tower; thermal tower distortion caused by temperatures differences between sides of the tower; or tower distortion from transient loads placed on the tower or nacelle.

Clause 13: The clause according to any one of clauses 1 through 12, wherein the plurality of 360-degree yaw sweeps comprises at least one yaw sweep in a positive direction and at least one yaw sweep in an opposite negative direction.

Clause 14: The clause according to any one of clauses 1 through 13, wherein the plurality of 360-degree yaw sweeps of the nacelle are conducted during low wind speeds so as to minimize transient wind loads that may cause deflection of the tower during the yaw sweeps.

Clause 15: The clause according to any one of clauses 1 through 14, wherein the rover receiver is located atop and at a back end of the nacelle at a predetermined fixed distance ("x") to a centerline axis of the nacelle, wherein the geo-location of the TPP along the centerline axis is computed based on the radius and distance "x".

Clause 16: The clause according to any one of clauses 1 through 15, wherein a plurality of the rover receivers are configured on the nacelle, the location signals from the rover receivers used to generate the circular plot and determine the radius for each of the rover receivers.

Clause 17: A system for determining deflection of a tower of a wind turbine, the wind turbine including a nacelle with a machine head and a rotor atop of the tower, the system comprising: at least one rover receiver of a global navigation satellite system (GNSS) configured at a fixed position on the nacelle or on the tower; a controller in communication with the rover receiver, the controller configured to perform the following operations: detecting a total deflection of a geographic location ("geo-location") of a fixed location on the tower; determining components of the total deflection that are generated by non-thrust loads acting on the tower; and subtracting the non-thrust loads deflection components from the total deflection to determine a thrust loads deflection component corresponding to deflection of the tower from operational thrust loads on the rotor.

Clause 18: The clause according to clause 17, wherein the controller is configured to: (a) based on a GNSS geo-location of the rover receiver and a known position of the fixed location relative to the rover receiver, compute the geo-location of the fixed location; and (b) repeat step (a) at least once more over a fixed time period and determining a total trajectory or displacement vector of the fixed location over the time period that represents the total deflection of the tower.

Clause 19: The clause according to any one of clauses 17 through 18, wherein the rover receiver is at a fixed position on the nacelle and the fixed location corresponds to a tower top pivot point (TPP) of the tower, the controller configured to: (a) receive and record geo-location signals from the rover receiver during a plurality of 360-degree yaw sweeps of the nacelle; (b) convert the geo-location signals into a circular plot and determining a radius of the circular plot, the radius being a distance between the rover receiver and the TPP; (c) based on a GNSS geo-location of the rover receiver and the radius, compute the geo-location of the TPP; and (d) repeating steps (a) through (c) at least once more over a fixed time period and determining a total trajectory or displacement vector of the TPP over the time period that represents the total deflection.

Clause 20: The clause according to any one of clauses 17 through 19, wherein the controller is further configured to apply a tower displacement correction factor to the radius from the yaw sweeps based on one or more of: weight overhang of the nacelle relative to a vertical axis of the tower; thermal tower distortion caused by temperatures differences between sides of the tower; and tower displacement from transient loads placed on the tower or nacelle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for determining deflection of a tower of a wind turbine, the wind turbine including a nacelle with a machine head and a rotor atop of the tower, the method comprising:
    establishing a fixed location relative to the tower;
    detecting a total deflection of a geographic location ("geo-location") of the fixed location;
    determining components of the total deflection that are generated by non-thrust loads acting on the tower;
    subtracting the non-thrust loads deflection components from the total deflection to determine a thrust loads deflection component corresponding to deflection of the tower from operational thrust loads on the rotor; and
    wherein the thrust loads deflection component is used directly as a control variable for performing one or more of:
    changing an operating parameter of the wind turbine based on a difference between an expected thrust loads deflection component and the determined thrust loads deflection component;
    performing a repair or maintenance procedure based on a difference between the expected thrust loads deflection component and the determined thrust loads deflection component; or
    determining tower or foundation integrity, or making a tower or foundation life prediction, based on a difference between the expected thrust loads deflection component and the determined thrust loads deflection component.

2. The method according to claim 1, further comprising, from the thrust loads deflection component, determining the rotor thrust resulting from operational loads acting on the rotor, and comparing the determined rotor thrust to an expected rotor thrust for operating conditions of the wind turbine.

3. The method according to claim 2, further comprising performing at least one of: changing the operating parameter of the wind turbine based on a difference between the expected rotor thrust and the determined rotor thrust; performing the repair or maintenance procedure based on a difference between the expected rotor thrust and the determined rotor thrust; or determining the tower or foundation integrity, or making the tower or foundation life prediction, based on a difference between the expected rotor thrust and the determined rotor thrust.

4. The method according to claim 1, wherein the steps of determining and subtracting the non-thrust loads deflection components from the total deflection comprises generating and applying a tower displacement correction factor to a vector of the total deflection prior to determining the geo-location of the fixed location.

5. The method according to claim 4, wherein the tower distortion correction factor corrects for tower displacement caused by any one or combination of: weight overhang of the nacelle relative to a vertical axis of the tower; thermal tower distortion caused by temperatures differences between sides of the tower; or tower distortion from transient loads placed on the tower or nacelle.

6. The method according to claim 1, wherein the step of detecting the total deflection of the geo-location of the fixed location comprises:
    (a) configuring at least one rover receiver of a global navigation satellite system (GNSS) at a fixed position on the nacelle or on the tower;
    (b) based on a GNSS geo-location of the rover receiver and a known position of the fixed location relative to the rover receiver, computing, via the controller, the geo-location of the fixed position; and
    (c) repeating steps (a) through (b) at least once more over a fixed time period and determining a total trajectory or displacement vector of the fixed location over the time period that represents the total deflection of the tower.

7. The method according to claim 6, wherein the rover receiver is in communication with a fixed base station receiver that transmits correction data to the rover receiver, wherein the GNSS geo-location of the rover is determined relative to the base station.

8. The method according to claim 6, wherein the GNSS geo-location of the rover is an absolute global latitude and longitude position supplied directly to the rover.

9. The method according to claim 1, wherein the fixed location corresponds to a tower top pivot point (TPP) of the tower, the step of detecting the total deflection of the geo-location of the TPP of the tower comprises:
    (a) configuring at least one rover receiver of a global navigation satellite system (GNSS) at a fixed position on the nacelle;
    (b) conducting a plurality of 360-degree yaw sweeps of the nacelle and recording geo-location signals received by the rover receiver during the yaw sweeps;
    (c) via a controller, converting the geo-location signals into a circular plot and determining a radius of the circular plot, the radius being a distance between the rover receiver and the TPP;
    (d) based on a GNSS geo-location of the rover receiver and the radius, computing, via the controller, the geo-location of the TPP; and
    (e) repeating steps (b) through (d) at least once more over a fixed time period and determining a total trajectory or displacement vector of the TPP over the time period that represents the total deflection of the tower.

10. The method according to claim 9, wherein the steps of determining and subtracting the non-thrust loads deflection components from the total deflection comprises generating and applying a tower displacement correction factor to the radius from the yaw sweeps prior to determining the geo-location of the TPP.

11. The method according to claim 10, wherein the tower distortion correction factor corrects for tower displacement caused by any one or combination of: weight overhang of the nacelle relative to a vertical axis of the tower; thermal tower distortion caused by temperatures differences between sides of the tower; or tower distortion from transient loads placed on the tower or nacelle.

12. The method according to claim 9, wherein the plurality of 360-degree yaw sweeps comprises at least one yaw sweep in a positive direction and at least one yaw sweep in an opposite negative direction.

13. The method according to claim 9, wherein the plurality of 360-degree yaw sweeps of the nacelle are conducted during low wind speeds so as to minimize transient wind loads that may cause deflection of the tower during the yaw sweeps.

14. The method according to claim 9, wherein the rover receiver is located atop and at a back end of the nacelle at a predetermined fixed distance ("x") to a centerline axis of the nacelle, wherein the geo-location of the TPP along the centerline axis is computed based on the radius and distance "x".

15. The method according to claim 14, wherein a plurality of the rover receivers are configured on the nacelle, the location signals from the rover receivers used to generate the circular plot and determine the radius for each of the rover receivers.

16. A system for determining deflection of a tower of a wind turbine, the wind turbine including a nacelle with a machine head and a rotor atop of the tower, the system comprising: at least one rover receiver of a global navigation satellite system (GNSS) configured at a fixed position on the nacelle or on the tower; a controller in communication with the rover receiver, the controller configured to perform the following operations: detecting a total deflection of a geographic location ("geo-location") of a fixed location on the tower; determining components of the total deflection that are generated by non-thrust loads acting on the tower; and subtracting the non-thrust loads deflection components from the total deflection to determine a thrust loads deflection component corresponding to deflection of the tower from operational thrust loads on the rotor; and wherein the thrust loads deflection component is used directly as a control variable for performing one or more of: changing an operating parameter of the wind turbine based on a difference between an expected thrust loads deflection component and the determined thrust loads deflection component; performing a repair or maintenance procedure based on a difference between the expected thrust loads deflection component and the determined thrust loads deflection component; or determining tower or foundation integrity, or making a tower or foundation life prediction, based on a difference between the expected thrust loads deflection component and the determined thrust loads deflection component.

17. The system according to claim 16, wherein the controller is configured to: (a) based on a GNSS geo-location of the rover receiver and a known position of the fixed location relative to the rover receiver, compute the geo-location of the fixed location; and (b) repeat step (a) at least once more over a fixed time period and determining a total trajectory or displacement vector of the fixed location over the time period that represents the total deflection of the tower.

18. The system according to claim 16, wherein the rover receiver is at a fixed position on the nacelle and the fixed location corresponds to a tower top pivot point (TPP) of the tower, the controller configured to:
  (a) receive and record geo-location signals from the rover receiver during a plurality of 360-degree yaw sweeps of the nacelle;
  (b) convert the geo-location signals into a circular plot and determining a radius of the circular plot, the radius being a distance between the rover receiver and the TPP;
  (c) based on a GNSS geo-location of the rover receiver and the radius, compute the geo-location of the TPP; and
  (d) repeating steps (a) through (c) at least once more over a fixed time period and determining a total trajectory or displacement vector of the TPP over the time period that represents the total deflection.

19. The system according to claim 18, wherein the controller is further configured to apply a tower displacement correction factor to the radius from the yaw sweeps based on one or more of: weight overhang of the nacelle relative to a vertical axis of the tower; thermal tower distortion caused by temperatures differences between sides of the tower; and tower displacement from transient loads placed on the tower or nacelle.

* * * * *